United States Patent [19]

Collia et al.

[11] Patent Number: 5,496,177

[45] Date of Patent: Mar. 5, 1996

[54] METHOD AND APPARATUS FOR PRESENTING NEW COMPUTER SOFTWARE FUNCTIONS TO A USER BASED UPON ACTUAL USAGE

[75] Inventors: Sherry S. Collia, Boulder, Colo.; Greg P. Fitzpatrick, Ft. Worth; William R. Sterrett, Dallas, both of Tex.

[73] Assignee: International Business Machines Corporation, Armonk, N.Y.

[21] Appl. No.: 214,085

[22] Filed: Mar. 15, 1994

Related U.S. Application Data

[63] Continuation of Ser. No. 36,117, Mar. 23, 1993, abandoned.

[51] Int. Cl.$^6$ ................................................. G09B 19/00
[52] U.S. Cl. ..................... 434/118; 434/322; 434/335; 434/323; 364/974.3; 364/948.2; 364/286; 364/283.2; 395/155; 395/160
[58] Field of Search ................................ 434/118; 395/700

[56] References Cited

U.S. PATENT DOCUMENTS 3,999,307  12/1976  Tsuda et al. .............................. 35/9 A
4,622,013  11/1986  Cerchio .................................... 434/118
4,701,130  10/1987  Whitney et al. ......................... 434/118
4,715,818  12/1987  Shapiro et al. .......................... 434/118
4,964,077  10/1990  Eisen et al. .............................. 364/900
5,002,491   3/1991  Abrahamson et al. .................. 434/322
5,018,082   5/1991  Obata et al. ............................. 364/521
5,316,485   5/1994  Hirose ..................................... 434/322

OTHER PUBLICATIONS

Adaptive Computer Assisted Instruction, Kellerman et al., Aug. 1978, IBM TDB 08–78, pp. 990–991.
Distributing Microcode Patches, Jeppson et al., Dec. 1983, IBM TDB 12–83 pp. 3402–3403.

Primary Examiner—Kevin A. Kriess
Assistant Examiner—L. Toplu
Attorney, Agent, or Firm—A. Bruce Clay

[57] ABSTRACT

A method is provided for introducing to a user a new/enhanced function of a computer software application. After learning the basics of a computer software application, new/enhanced functions are presented to the user based upon completion of predetermined criteria. The predetermined criteria may comprise the passage of time or the completion of a specified number of uses of a certain function.

8 Claims, 3 Drawing Sheets

Initial Notice

Learn Options

Added Function

METHOD AND APPARATUS FOR PRESENTING NEW COMPUTER SOFTWARE FUNCTIONS TO A USER BASED UPON ACTUAL USAGE

The application is a continuation of application Ser. No. 08/036,117, filed Mar. 23, 1993, now abandoned.

TECHNICAL FIELD OF THE INVENTION

The present invention relates in general to computer software, and in particular to a method and apparatus for introducing new functions in a computer program based upon a user's familiarity with the basics of the program.

BACKGROUND OF THE INVENTION

Computer software products are available in a myriad of areas. There are software products that keep a daily calendar, provide a phone book, provide tax preparation, have accounting information, receive and send electronic mail, do word processing, and so on. These software products may have a rich set of available functions which can overwhelm an initial or novice user. There are numerous shortcuts, editing aids, help functions, menus, etc., which are typically learned only through time by experimentation and continued usage. However, since a novice user may have sufficient difficulty just getting adjusted to the basics of a program, he/she may never want or be able to use some of the more sophisticated functions. In some cases, a novice user may become so overwhelmed with the available functions on a software product that the product may not be used at all or used on such a limited basis as to make it cost ineffective.

Traditionally, software is delivered to a customer with paper documentation (a manual) to describe the full functions of the product. Thus a novice user, or even a more experience user, may have to resort to a manual to understand how certain functions work and interact with other functions. A manual can be as overwhelming as the many features available on the software. Many users shy away from manuals because they may be difficult, as well as time-consuming to use.

Software packages may also be provided with help functions. Sometimes help functions are too little or too much. In an attempt to resolve this problem, it is known in the art to provide automatically adjustable help information. For example, when a software application is initially installed, it is assumed that the user is inexperienced and therefore, help functions are more detailed. As usage of the software increases, it is assumed that the user has learned the basics and therefore, the help information displayed becomes progressively less detailed.

While a paper documentation of software may always be necessary, it is not always desirable to need to refer to the paper documentation to learn about more advanced functions. Thus, there is a need for a method and apparatus which introduces more advanced functions of a software application as the user becomes more familiar with the basics of the application or as usage increases.

SUMMARY OF THE INVENTION

The present invention provides a method of introducing new and/or enhanced functions available to a computer software application which substantially reduces or eliminates problems with the prior art. The present invention allows a user of a software application to gradually learn proper use of the enhanced features of the application.

In accordance with one aspect of the present invention, a method of introducing to a user a new and/or enhanced function available to a computer software application is provided. Release of a new and/or enhanced function to the user is predicated upon attainment of a predetermined criteria. The predetermined criteria may comprise a specified amount of time, a predetermined number of events, or a manual activation.

In accordance with another aspect of the present invention, a method of teaching a user of a computer software application the use thereof is provided. Sufficient functions are initially presented to the user to allow the learning of a basic level of usage. New functions are presented to the user based upon predetermined criteria such as time or events.

The present invention provides a technical advantage in that a user of a software application is not overwhelmed with too many functions until the basics are learned.

BRIEF DESCRIPTION OF THE DRAWINGS

For a more complete understanding of the present invention and the advantages thereof, reference is now made to the Detailed Description taken in conjunction with the attached Drawings, in which.

DETAILED DESCRIPTION OF THE INVENTION

Figure 1:
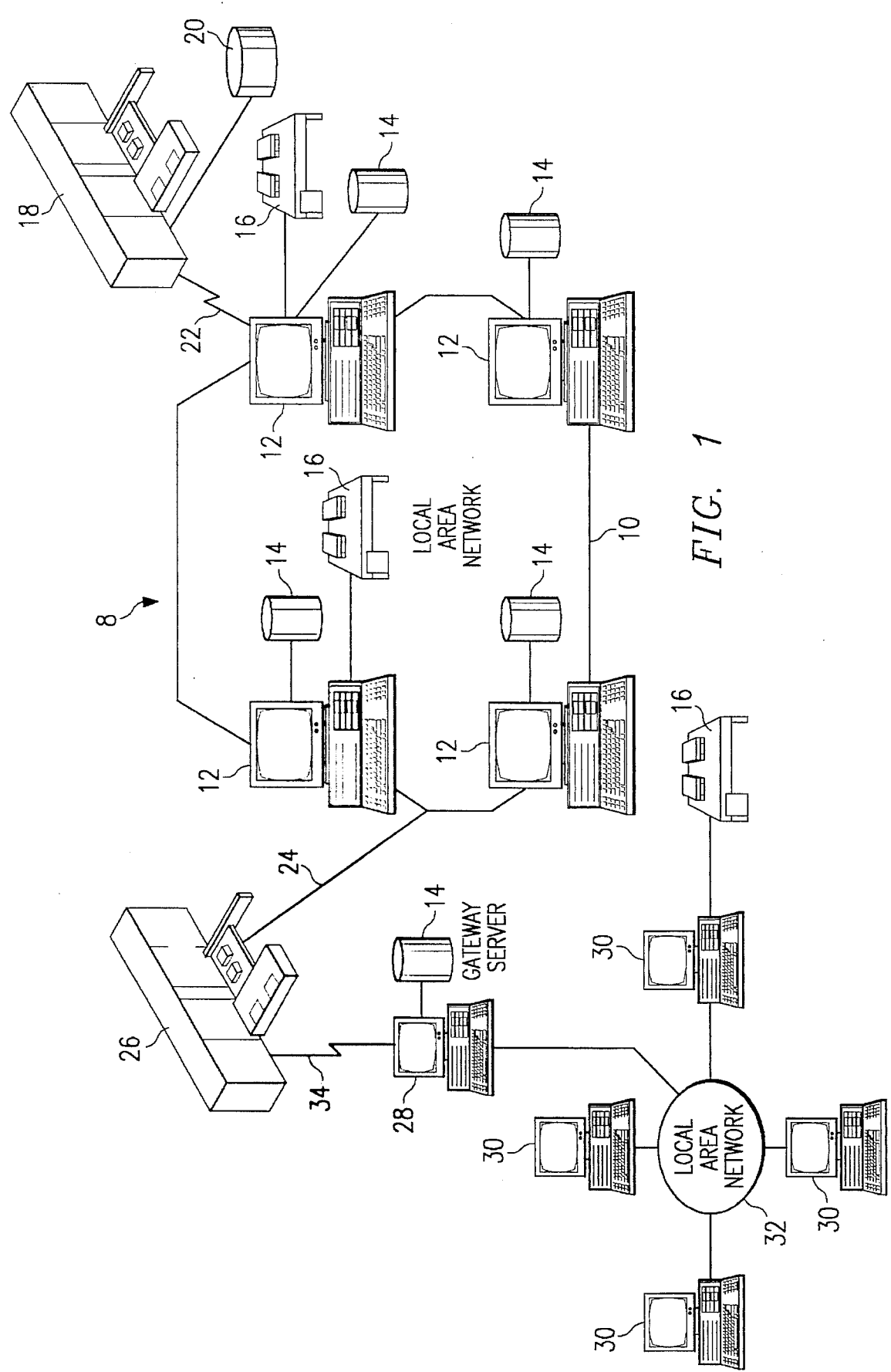
FIG. 1 is a schematic illustration of a data processing system in accordance with the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. The gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and, similarly, LAN 10 may be located a substantial distance from LAN 32. For example, LAN 32 may be located in California, while LAN 10 may be located within Texas, and mainframe computer 18 may be located in New York.

Stored computer software applications, whether they be for use through a LAN, a mainframe computer or an IWS, may be provided with a rich set of available functions. In fact, the available functions may be so rich as to overwhelm a novice user. Traditionally, the only resources available to learn how to use the many functions in an application come from some type of on-line help feature or a paper manual. Unfortunately, on-line help and paper manuals may be as confusing and difficult to use as the available application functions. Once a user becomes familiar with the basic functions, there may be a desire to use more advanced functions. However, by this time, the user may have become too entrenched with the learned functions to attempt more advanced functions.

In accordance with the present invention, design of an application will be for phased sets of functions that start with basic user needs and progressively and selectively move into more enhanced or enriched functions. More enriched functions can be made available based upon a predetermined criteria such as, for example, elapsed time since installation of the application, a number of usage triggers or manual activation. Thus, after a certain number of days or preferably after a predetermined number of usage events, a new or more advanced function can be introduced to the user. When the new function in introduced, a new set of instructions or "helps" could simultaneously be introduced to assist the user. It may be desirable to provide a manual "trigger" to allow a user (or system administrator) to force the introduction of a new or of all the functions.

Figure 2:
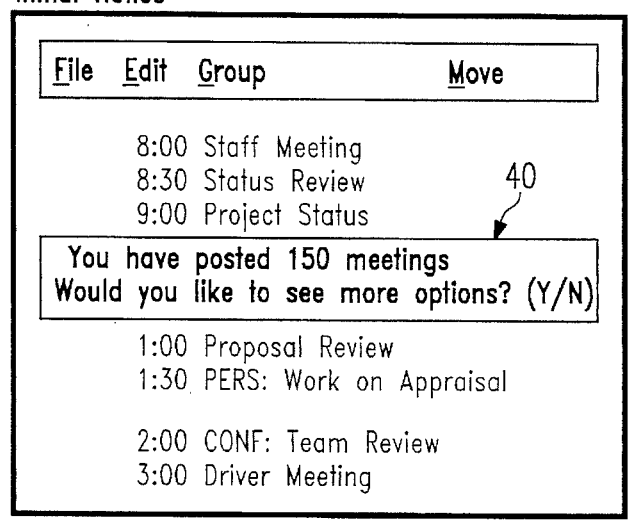
FIG. 2 illustrates a pop-up which would be presented to a user to indicate the attainment of a predetermined level of usage.
Figure 3:
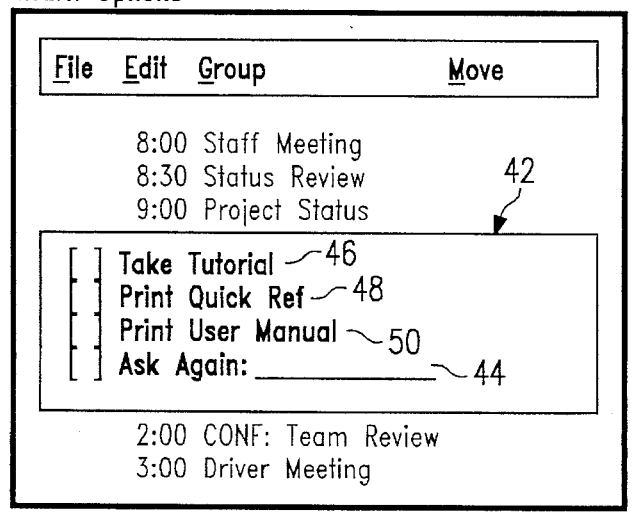
FIG. 3 illustrates a pop-up presented to a user upon selection of a desire to see more options.
Figure 4:
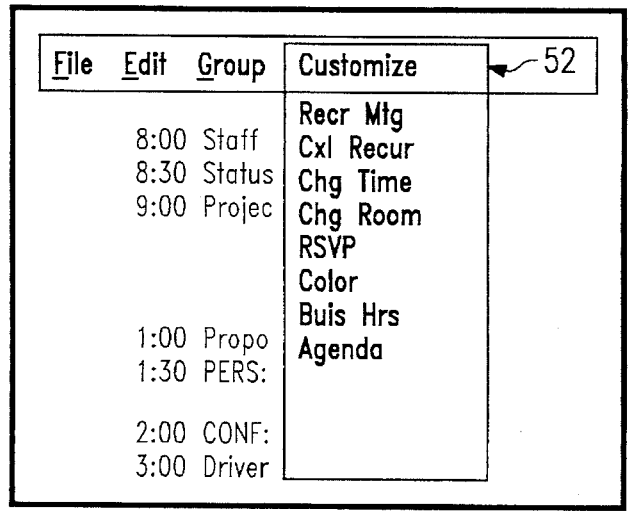
FIG. 4 illustrates a pop-up of a new command "customize" and its related subcommands upon attainment of a predetermined level of usage criteria in accordance with the present invention.

Referring to FIGS. 2, 3 and 4, an example of how the present invention may be utilized is shown. Referring first to FIG. 2, a predetermined number of events has occurred, i.e. a total of 150 meetings has been posted to a calendar application as shown by a message which is generally indicated by the reference numeral 40. When the calendar application was developed, the event trigger of 150 meetings posted was determined to be sufficient usage for a user thereof to become reasonably familiar with the basics. Thus the message 40 has been generated to let the user know that more features are available if the user wants to use them. If the user decides that there is no desire at this time for additional features, the option N (No) is selected and the application will continue to run as before until another predetermined number of events occurs.

If the user wants to see the new feature(s), Y (Yes) is selected. Referring to FIG. 3, the message 40 has been replaced by a new message 42 as a result of the user's selection of the Y option. The message 42 presents the user with a plurality of options for learning the new function or an option providing a second chance to learn about the new function at a different time. If the user selects, for example, "Ask Again:_" 44, the application will revert to the previously available functions until the appropriate new criteria occurs (the new criteria will be entered into the space provided).

If the user selects, for example, "Take Tutorial" 46, the user will be presented with the new function (as indicated by the reference numeral 52 in FIG. 4) upon completion of the tutorial. If the user selects, for example, "Print Quick Reference" 48 or "Print User Manual" 50, the user will be presented with the new function 52 (as well as the printed information). The new function 52 will preferably be highlighted in some manner (such as different color, bold print, etc.) to call the user's attention thereto until a predetermined event occurs (such as the passage of time, the selection of the option, movement to another panel, etc.).

Figure 5:
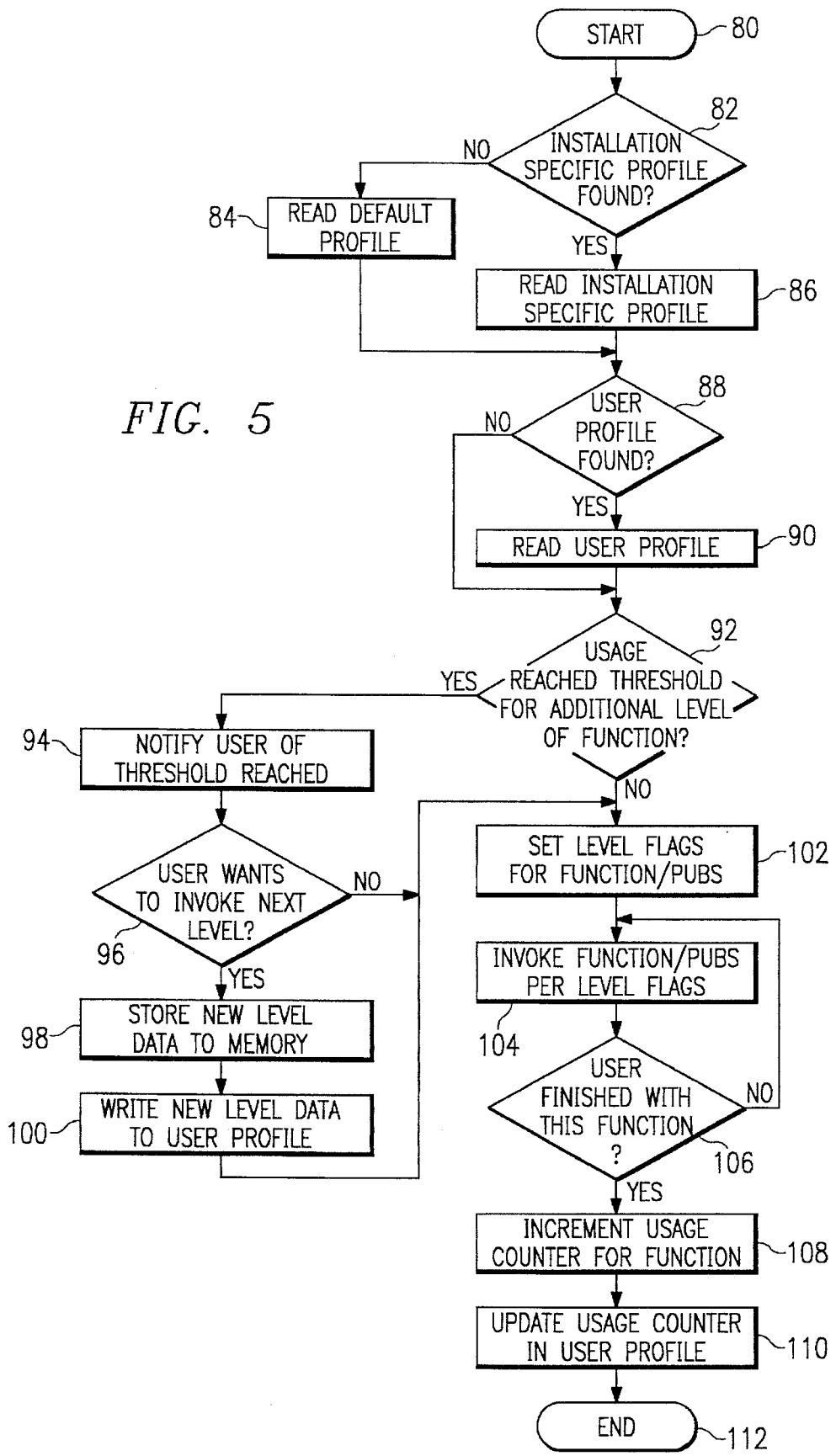
FIG. 5 is a flowchart illustrating the present invention.

Referring to FIG. 5, a flowchart illustrating the present invention is shown. After starting at 80, it is determined at decision block 82 whether or not an installation specific profile is found. An installation specific profile would be set by a System Administrator or Site Manager to allow an entire location, group, etc. to have the same trigger for a function. In addition, a single user could manually force the presentation of new functions through decision block 82. If the response to decision block 82 is no, a default profile (set by the application developer) is read at block 84. If the response to decision block 82 is yes, an installation specific profile is read at block 86. Subsequent to block 84 or block 86, it is determined at decision block 88 whether or not a user profile is found. The user profile corresponds to the user's ability to accept or reject the offering of a new/enhanced function as well as the current level of functions available thereto. If the response to decision block 88 is yes, the user profile is read at block 90. If the response to decision block 88 is no, or subsequent to block 90, it is determined at decision block 92 whether or not usage has reached a threshold for an additional level of function disclosure. If the response to decision block 92 is yes, the user is notified of the attainment of a threshold at block 94. It is then determined at decision block 96 whether or not the user wants to invoke the next level.

If the response to decision block 96 is yes, a new level of data is stored to memory at block 98. A new level of data is then written to the user profile at block 100. If the response to decision block 96 is no, or if the response to decision block 92 was no, or subsequent to block 100, level flags are set for the current function/publications at block 102. Activation of the level flags allows the previously unseen functions and related on-line publications including "HELP" to be displayed to the user. The function/publications are invoked per the level flags at block 104. It is then determined at decision block 106 whether or not the user is finished with this function. If the response to decision block 106 is no, the present invention returns to block 104. If the response to decision block 106 is yes, a usage counter is incremented for this function at block 108. The usage counter is then updated in the user profile at block 110 and the present invention ends at 112.

Thus, in accordance with the present invention, a new or novice user of a computer software application is allowed the opportunity to learn the basics of the application before being presented with more functions than he or she can initially handle. Upon the attainment of a certain level of proficiency, as predetermined during the development of the application (for automatic advancement) or as manually determined by the user, new/enhanced functions are presented to the user. The user can force the introduction of new/enhanced functions at any time or may continue to delay the introduction thereof for as long as desired. As a result of the present invention, a software application may be utilized more fully as the user becomes more familiar with its use and, therefore, may be a more marketable product.

Although the present invention has been particularly shown and described with reference to a preferred embodi-

We claim:

1. A computer implemented method of introducing to a user at least one previously unrevealed function of a computer software application, the software application comprising a plurality of functions including at least one function needed for basic operation of the application and the at least one previously unrevealed function, comprising the steps of:

dividing a software application into a plurality of levels including at least a first level and a second level as determined by which ones of a plurality of functions are utilized therein, said first level utilizing at least the at least one function needed for basic operation and said second level utilizing at least the at least one previously unrevealed function;

defining a profile which includes a user adjustable criteria for triggering introduction of each of said plurality of levels, said criteria corresponding to actual usage of said software application;

presenting only-said first level to the user for initial use of said software application;

optionally introducing additional ones of said plurality of levels to the user upon attainment of said adjustable criteria therefor; and presenting said first level and any of said additional ones of said plurality of levels subsequently introduced to the user by said attainment of said adjustable criteria therefor upon continuing use of said software application by the user.

2. The method of claim 1, wherein said step of defining a profile comprises the step of:

designating passage of a predetermined amount of time since a start time of usage of the software application as said user adjustable criteria.

3. The method of claim 1, wherein said step of defining a profile comprises the step of:

designating completion of a predetermined number of occurrences of usage of the software application as said user adjustable criteria.

4. The method of claim 1, further comprising the step of: manually triggering introduction of each of said plurality of levels.

5. A computer system for introducing to a user at least one previously unrevealed function of a computer software application, the software application comprising a plurality of functions including at least one function needed for basic operation of the application and the at least one previously unrevealed function, comprising:

means for dividing a software application into a plurality of levels including at least a first level and a second level as determined by which ones of a plurality of functions are utilized therein, said first level utilizing at least the at least one function needed for basic operation and said second level utilizing at least the at least one previously unrevealed function;

means for defining a profile which includes a user adjustable criteria for triggering introduction of each said plurality of levels, said criteria corresponding to actual usage of said software application;

means for presenting only said first level to the user for initial use of said software application;

means for optionally introducing additional ones of said plurality of levels to the user upon attainment of said adjustable criteria therefor; and means for presenting said first level and any of said additional ones of said plurality of levels subsequently introduced to the user by said attainment of said adjustable criteria therefor upon continuing use of said software application by the user.

6. The system of claim 5, wherein said means for defining a profile comprises:

means for designating passage of a predetermined amount of time since a start time of usage of the software application as said user adjustable criteria.

7. The system of claim 5, wherein said means for defining a profile comprises:

means for designating completion of a predetermined number of uses of the software application as said user adjustable criteria.

8. The system of claim 5, further comprising:

means for manually triggering introduction of each of said plurality of levels.

* * * * *